United States Patent [19]
Blend et al.

[11] Patent Number: 5,894,406
[45] Date of Patent: Apr. 13, 1999

[54] ELEVATED SEPARATE EXTERNAL KEYBOARD APPARATUS FOR USE WITH PORTABLE COMPUTER

[76] Inventors: Michael L. Blend, 16427 Axis Trail, San Antonio, Tex. 78232; Allan C. Lichtenberg, 401 E. 34th St., #N4D, New York, N.Y. 10016

[21] Appl. No.: 08/523,561

[22] Filed: Sep. 5, 1995

[51] Int. Cl.$^6$ .................. G06F 1/16; H05K 5/02
[52] U.S. Cl. .................... 361/680; 235/146
[58] Field of Search ................ 361/680, 681, 361/683, 686; 400/472, 682, 496; 235/145 R, 145 A, 146; 364/708.1, 709.1, 709.12; 312/208.1, 208.3, 208.4; D14/114, 115; D18/7, 12

[56] References Cited

U.S. PATENT DOCUMENTS

| | | | |
|---|---|---|---|
| 4,075,465 | 2/1978 | Funk et al. | 400/472 |
| 4,092,527 | 5/1978 | Luecke | 364/708.1 |
| 4,456,315 | 6/1984 | Markley et al. | 312/137 |
| 4,899,137 | 2/1990 | Behrens et al. | 340/711 |
| 5,132,876 | 7/1992 | Ma | 361/681 |
| 5,175,398 | 12/1992 | Hofman | 174/169 |
| 5,187,644 | 2/1993 | Crisan | |
| 5,193,924 | 3/1993 | Larson | 400/472 |
| 5,214,429 | 5/1993 | Greenberger | 341/22 |
| 5,229,920 | 7/1993 | Spanoil et al. | 361/681 |
| 5,278,779 | 1/1994 | Conway et al. | |
| 5,319,582 | 6/1994 | Ma | |
| 5,336,001 | 8/1994 | Lichtenberg | |
| 5,481,645 | 1/1996 | Bertino et al. | 361/680 |
| 5,514,855 | 5/1996 | Sullivan | 235/145 R |
| 5,531,529 | 7/1996 | Nusser | 400/472 |
| 5,590,022 | 12/1996 | Harvey | 361/683 |

*Primary Examiner*—Lynn D. Feild
*Attorney, Agent, or Firm*—John P. O'Banion

[57] ABSTRACT

An external keyboard apparatus is fitted to rest above the embedded keyboard of a general purpose portable microcomputer. In one embodiment an external keyboard housing is molded to define a cavity for receiving at least a portion of a keyboard compartment of the portable computer. In another embodiment, an external keyboard stand supports an external keyboard to define the external keyboard apparatus. A first connection is established between the external keyboard and keyboard stand to secure the external keyboard to the stand.

22 Claims, 9 Drawing Sheets

ELEVATED SEPARATE EXTERNAL KEYBOARD APPARATUS FOR USE WITH PORTABLE COMPUTER

BACKGROUND OF THE INVENTION

This invention relates to computer keyboards, and more particularly to external keyboards for use with general purpose portable microcomputers.

Portable "personal" computers have developed from the early cumbersome suitcase design to smaller laptops designs to the now commercially-predominant notebook, sub-notebook and palm top computers. The evolution has been toward smaller, lighter computers with increasing transportability and usability. The state of the art continues to improve by (i) increasing battery life, (ii) decreasing circuitry and system weight, (iii) adapting compartments for add-in cards, and (iv) decreasing housing size.

The typical portable computer includes a display screen housing hinged to a keyboard housing. The display screen housing folds down against the keyboard where the two housings latch together. A disk drive often is mounted in the keyboard housing. Additional features include input/output ports and one or more compartments for receiving PCMCIA cards, (peripheral devices conforming to the Personal Computer Memory Card International Association (PCMCIA) standards for personal computer-based peripherals).

A trade-off widely accepted in portable computer design is to limit the size of the embedded keyboard relative to the conventional "full-sized" keyboards used with desktop general purpose micro-computers. The decreased size and weight increases transportability, but compromises usability. Specifically, the portable computer keyboard often has keys closer together and/or smaller than the full-size keyboard. In addition, the portable computer keyboard keys typically have a shorter key height and travel a shorter path when pressed. Often certain specialty keys are positioned in different relative locations compared to the full-size keyboard. Users may get used to the embedded keyboard or just remain frustrated committing repeated typing errors.

To partially circumvent this shortcoming, many portable computers include a port allowing connection of an external full-size keyboard. The user who does so gets the benefit of the full-size keyboard features, but suffers other inconveniences. Presently, the user plugs the external keyboard into the external keyboard port, then places the external keyboard in front of the portable computer. As shown in FIG. 1, the display screen 12, attached to the portable computer 10, is separated from the user by both the smaller embedded keyboard 14 and the external full-size keyboard 16.

The set-up with both keyboards in plain view presents visual and operational inconveniences for the user. With regard to the visual inconveniences, the user sees two distinct keyboards at all times. This is aesthetically annoying and even confusing. The user's field of view is cluttered by two sets of letter, number, function and navigation keys. The extra visual stimuli is often distracting. Minimal visual distraction is preferred so one may focus on the work (or play) at hand. The user also is further displaced from the display screen by at least the space occupied by the embedded keyboard. Given the typically small size and often mediocre visual properties of many portable computer display screens, it is preferable to give the user the option of residing closer to the display screen.

With regard to the operational inconveniences, the external keyboard occupies a significant extra "footprint." With the trend being for increasingly mobile and increasingly flexible work habits, many users do not want to devote precious desk space to an extra keyboard. Accordingly, it is desirable to provide a keyboard solution without significantly increasing the computer and keyboard "footprint."

The external keyboard, due to its need for additional space, also discourages its use at other than a base location. Users are unlikely to transport the external keyboard with the portable computer for use at other locations, in part because of the extra space requirements.

Improvements in the portable computer keyboard area have been focused on removable keyboards, additional plug-in numeric keypads, and more recently, fold out "butterfly" keyboards. The fold-out keyboards are directed at enlarging the key layout area to improve usability. However, such keyboards still are limited to the shorter key heights and travel paths of the typical portable computer keyboard. In addition such keyboards are generally flat and do not allow the inclines or adjustable inclines of conventional full-size external keyboards. This invention is directed toward improving the usability of full-size external keyboards with portable computers.

SUMMARY OF THE INVENTION

According to the invention, an external keyboard apparatus rests above the embedded keyboard or keyboard compartment of a general purpose portable microcomputer. The external keyboard apparatus covers at least a part of the embedded keyboard or keyboard compartment improving visual and operational convenience for the user.

According to one aspect of the invention, the external keyboard apparatus is elevated to rest on or above a portion of the portable computer's keyboard compartment.

According to another aspect of the invention, an external keyboard apparatus embodiment defines an integral housing. The housing underside defines a cavity. In one embodiment the cavity is of a depth approximating the height of a conventional portable notebook computer keyboard compartment and of a length approximating the length of a conventional portable notebook computer. During operation, the external keyboard apparatus is placed over at least a portion of the embedded keyboard compartment. In one embodiment the external keyboard hides the embedded keyboard keys from view.

According to another aspect of the invention, an external keyboard apparatus embodiment defines an external keyboard and propping devices. The propping devices support the external keyboard above the portable computer. In one embodiment the legs or other propping devices are part of the external keyboard. In another embodiment, the legs or other propping devices are separate structures apart from the external keyboard. For example, legs, pedestals, or pads define separate support structures for elevating the external keyboard. In one embodiment, such support structures rest upon or are integral to the portable computer. In another embodiment, such structures rest upon an underlying desktop or other surface.

According to various embodiments, the legs or other propping structures have a fixed height or an adjustable height, and have a fixed orientation or fold, telescope or otherwise retract.

According to another aspect of this invention, an external keyboard apparatus includes a keyboard stand and an external keyboard. The keyboard stand supports or otherwise receives an external keyboard. In one embodiment, the stand is molded at an undersurface to define a cavity for receiving the portable computer. In another embodiment, the stand defines legs or other propping devices as discussed above.

According to another aspect of the invention. the external keyboard is secured in place at the stand. In one embodiment the external keyboard slides along a top surface of the stand to a home position. In another embodiment the keyboard is placed at a defined position and secured. In various embodiments. the external keyboard rests at or is locked into the defined position relative to the stand.

According to another aspect of the invention, a communication path is defined upon alignment of the external keyboard apparatus and portable computer. In one embodiment respective connectors mate when the external keyboard apparatus is aligned and positioned.

One advantage of this invention is that the user gets the functional benefits of an external keyboard, such as a conventional full-size keyboard, without experiencing visual or operational distractions. Another advantage is that the portable computer / external keyboard combination takes up only slightly more desktop space than the portable computer alone, and substantially less space than in the conventional layout shown in FIG. 1.

These and other aspects and advantages of the invention will be better understood by reference to the following detailed description taken in conjunction with the accompanying drawings.

DESCRIPTION OF SPECIFIC EMBODIMENTS

The external keyboard apparatus of this invention is for use with a general purpose portable micro-computer. The apparatus overlays at least a portion of the keyboard compartment of the portable computer to improve user convenience and operability.

General Purpose Portable Micro-Computer

General purpose portable micro-computers include laptop computers and the now more commercially-predominant notebook, sub-notebook and palm top computers. An early portable "notebook" computer is described in Compaq Computer Corporation trade Literature No. 041A/0990, entitled "Compaq LTE/286 and Compaq LTE (September 1990).

Figure 1:
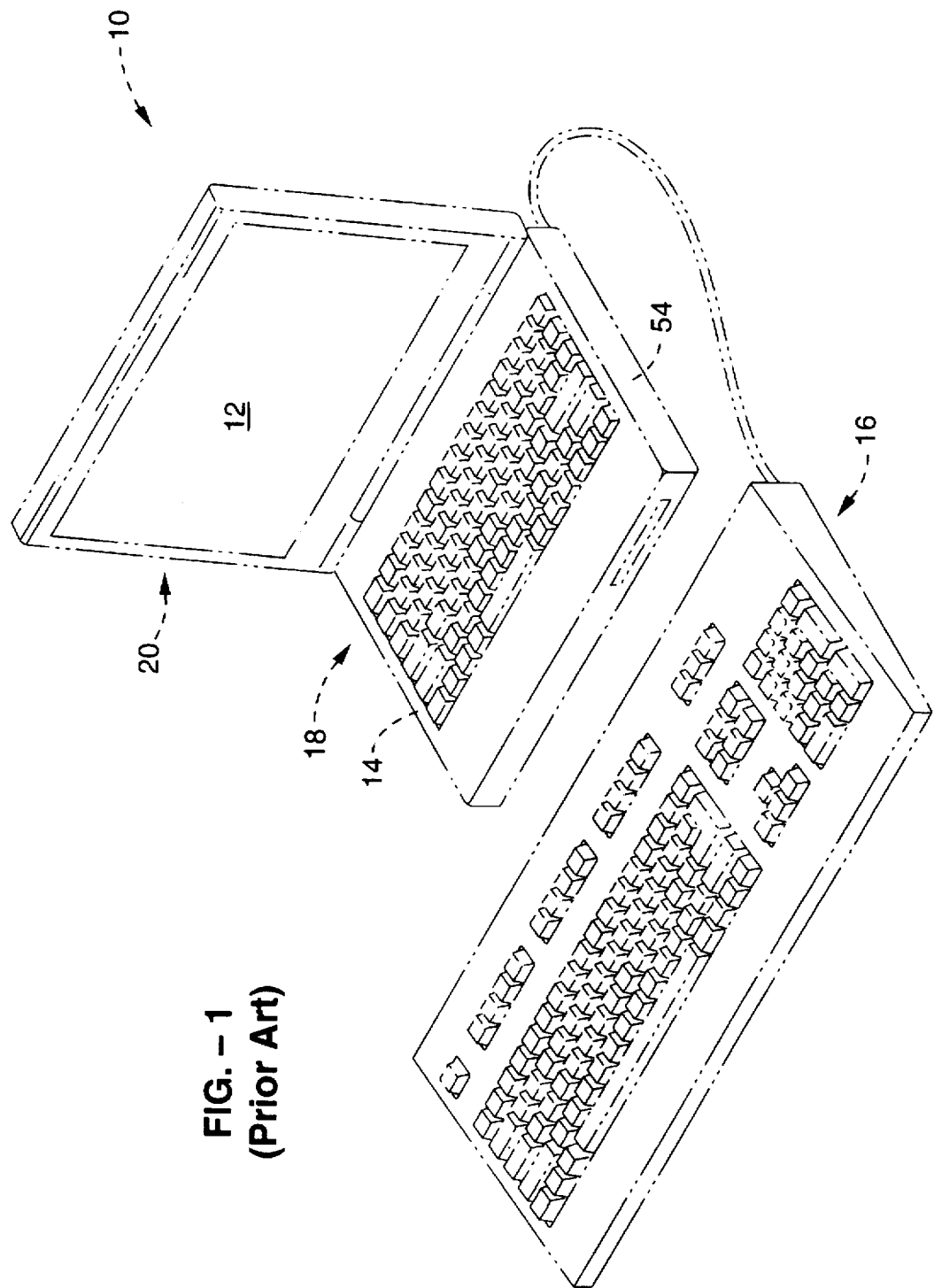
FIG. 1 is a diagram of a conventional user layout in which a conventional external keyboard is positioned in front of the embedded keyboard and display screen portions of a portable computer.

Referring to FIG. 1, a typical portable computer 10 includes a lower housing compartment 18 and an upper housing compartment 20. The lower housing compartment 18 includes an embedded keyboard 14, main computer board, and one or more compartments for receiving peripheral devices. Many portable computers 10 also include a floppy disk drive, hard disk drive and battery pack in the lower compartment 18. The floppy disk drive typically is accessible at either one of the front or side edges of the lower compartment 18. Other common internal or plug-in peripherals include fax devices, modems devices, and CD-ROM devices. The upper housing compartment 20 typically includes the display screen 12 and related display driver circuitry.

External Keyboard Apparatus—Keyboard / Leg Embodiments

Figure 2:
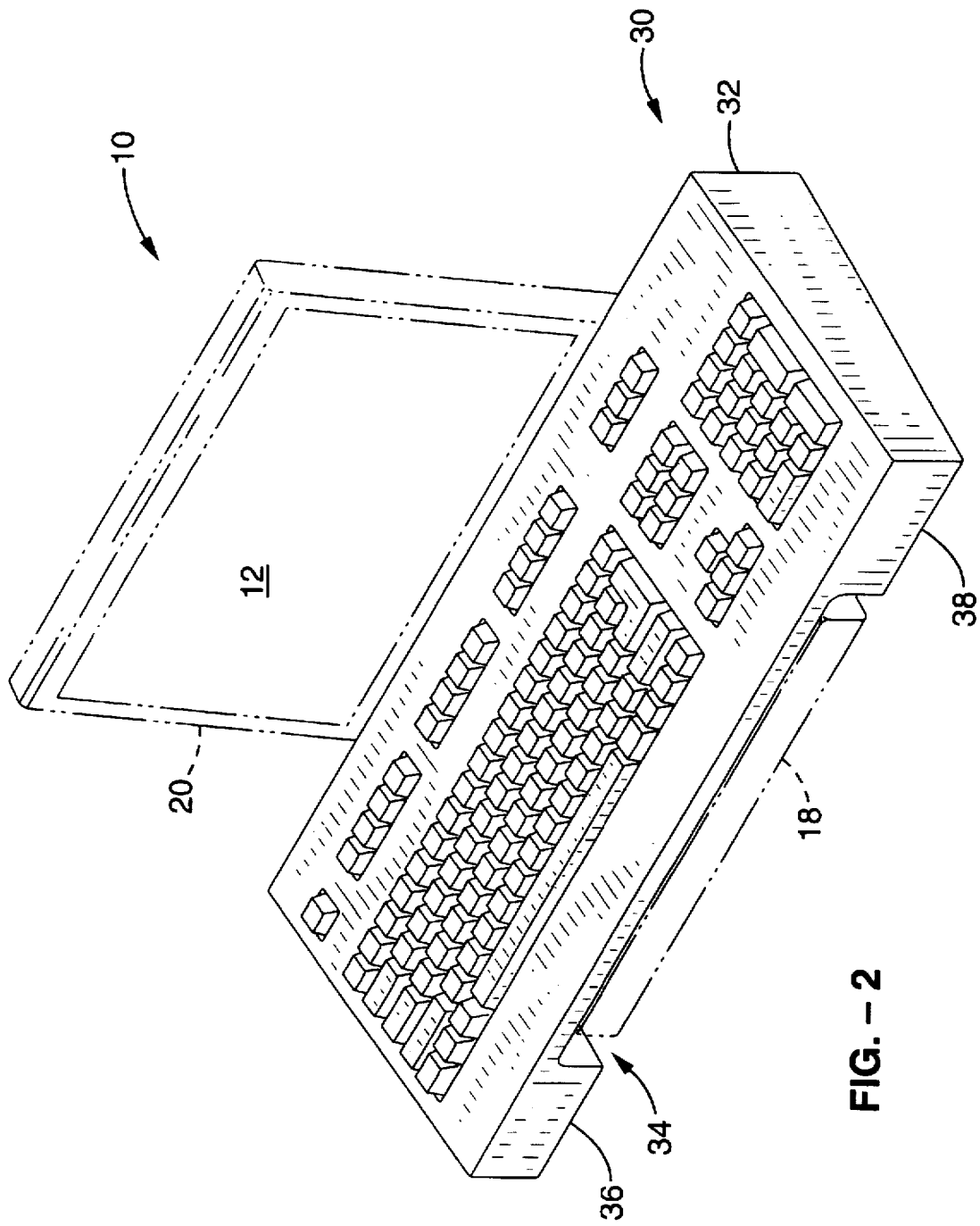
FIG. 2 is a diagram of an external keyboard apparatus in combination with a portable computer according to an embodiment of this invention.

FIG. 2 shows an external keyboard apparatus 30 embodiment having a housing 32 which defines a recess 34 for receiving the lower compartment 18 of the portable computer 10. The apparatus 30 has a length and width approximating that of a conventional full-size keyboard 16, (e.g., 21 inches by 8 inches). Other dimensions are used in alternative embodiments. The apparatus 30 also has a conventional or non-conventional keyboard layout. The preferred embodiment includes a conventional QWERTY layout. Common adaptations includes the AT keyboard layout, XT keyboard layout, and Apple MACINTOSH™ keyboard layout. Another variation is described in U.S. Pat. No. 5,336,001.

The apparatus 30 is formed by a housing 32 which defines a recess at an undersurface. The apparatus 30 rests in a position covering at least a portion of the keyboard compartment 18 of the portable computer 10. In a preferred embodiment, the apparatus 30 covers the embedded keyboard 14.

Figure 3:
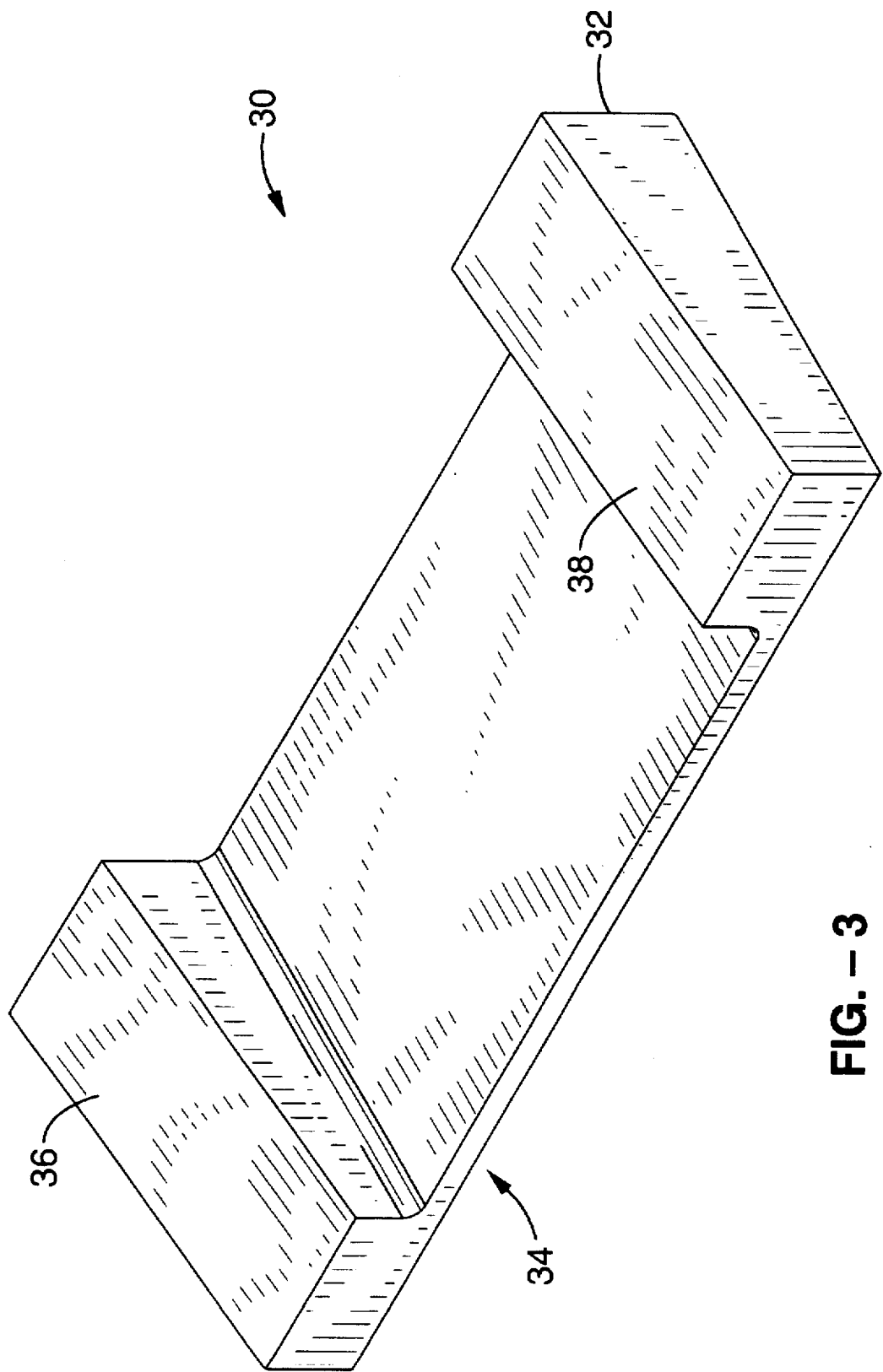
FIG. 3 is a perspective view of an underside of the external keyboard apparatus of FIG. 2 according to an embodiment of this invention.

In one embodiment, the recess 34 spans approximately 12–14 inches and recedes to a depth of approximately 1.5 to 2.5 inches. Other recess dimensions also are used. As shown the apparatus 30 includes two integral pedestals 36, 38 or other support members. FIG. 3 shows a bottom view of the apparatus 30 having two pedestals 36, 38. Typically, the pedestals or other supporting members rest on the desktop with the portable computer.

Figure 4:
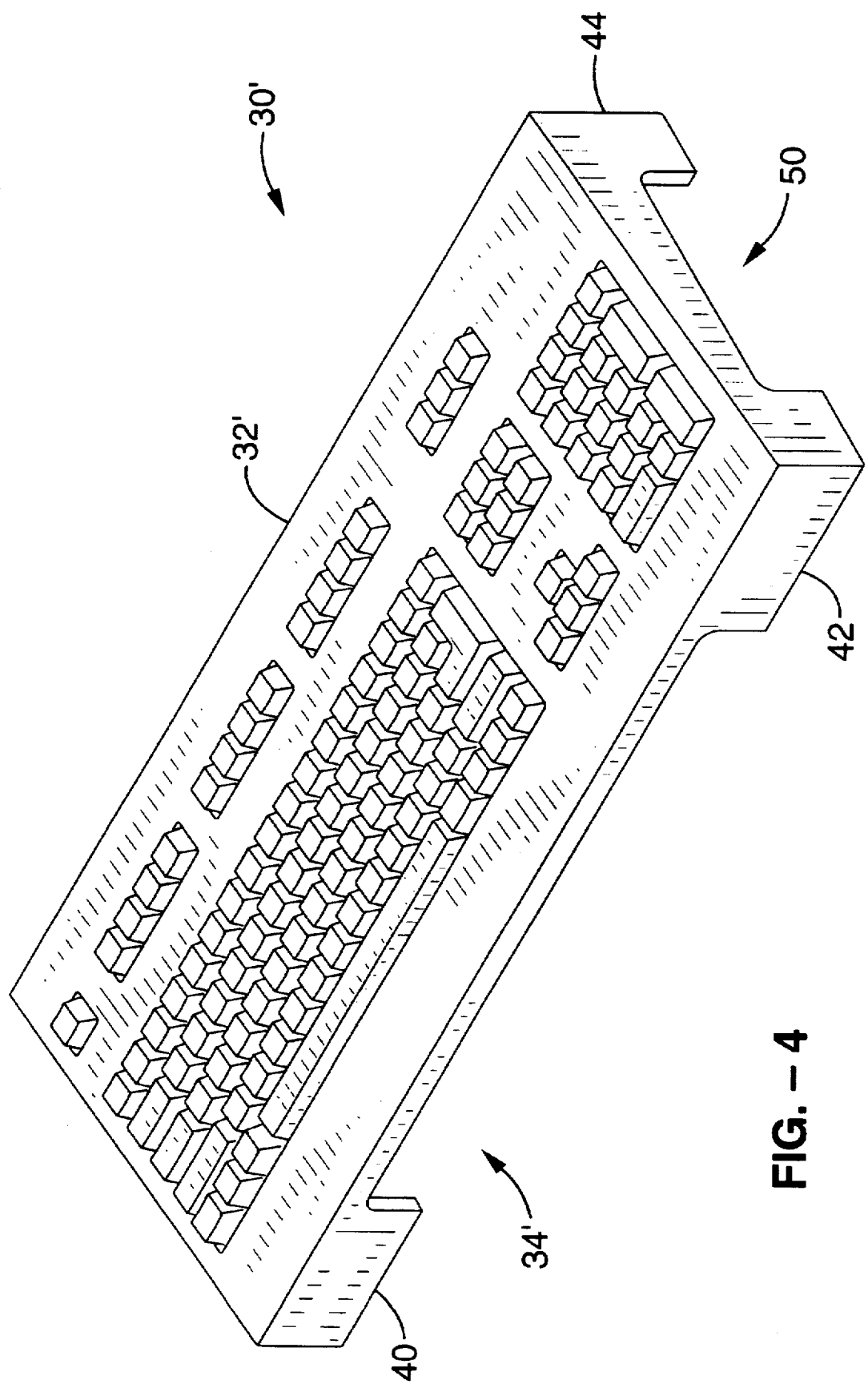
FIG. 4 is a perspective view of an external keyboard apparatus according to an alternative embodiment of this invention.
Figure 5:
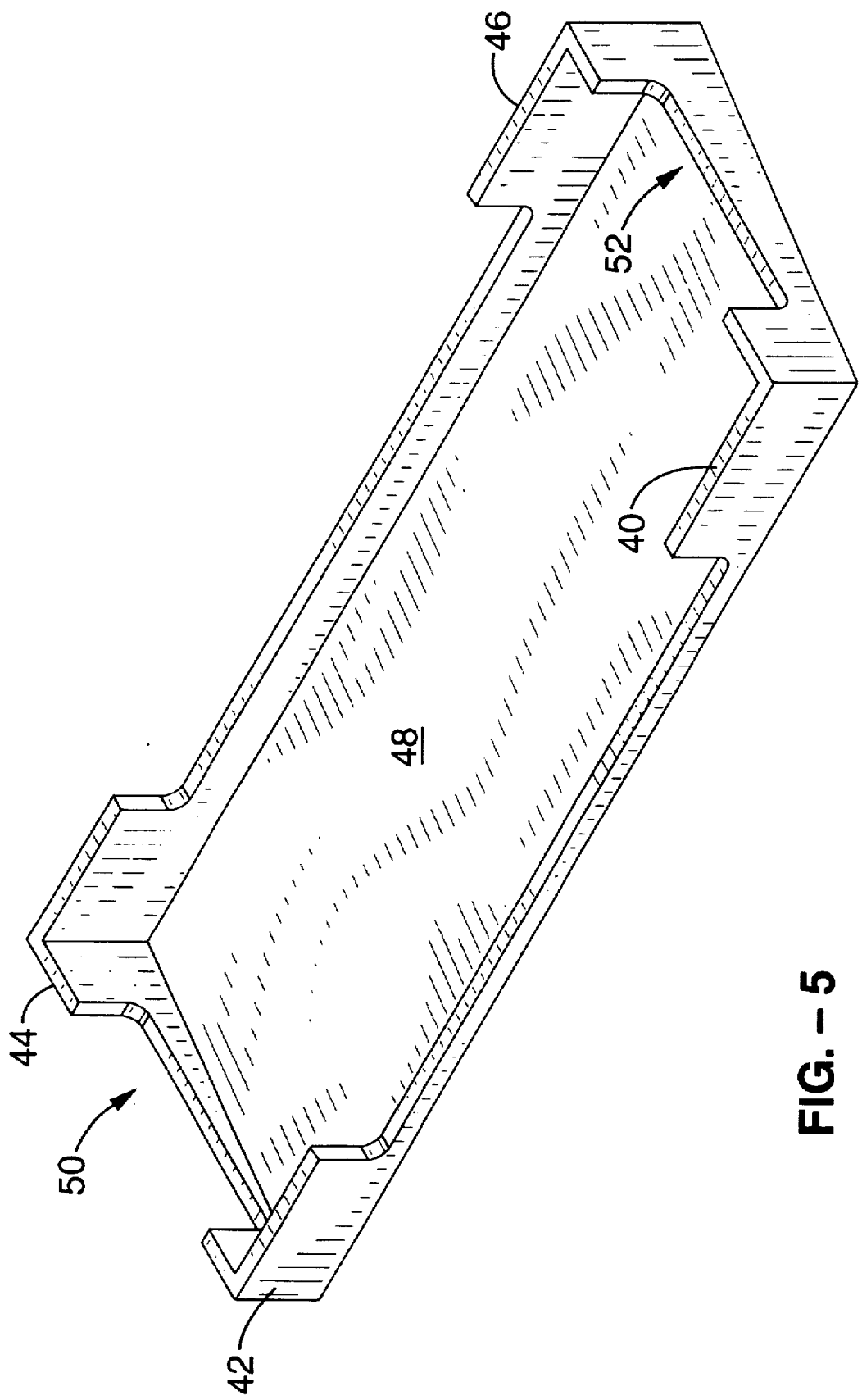
FIG. 5 is a perspective view of the underside of the external keyboard apparatus of FIG. 4.

As some portable computers provide access to a floppy drive, CD-ROM drive or other peripheral device at a side panel 54, an alternative embodiment 30' includes side openings. FIG. 5 show the external keyboard apparatus 30' according to such embodiment. The apparatus 30' includes a housing 32' which defines a recess 34' for receiving the lower compartment 18 of the portable computer 10. Openings 50, 52 are defined at opposing side surfaces for accessing sides of the portable computer 10. The apparatus 30' includes four integral legs 40, 42, 44, 46, pedestals or other support members. In the embodiment of FIG. 4 and FIG. 5, the recess 34 spans most of the undersurface 48 of apparatus 30'.

Figure 6:
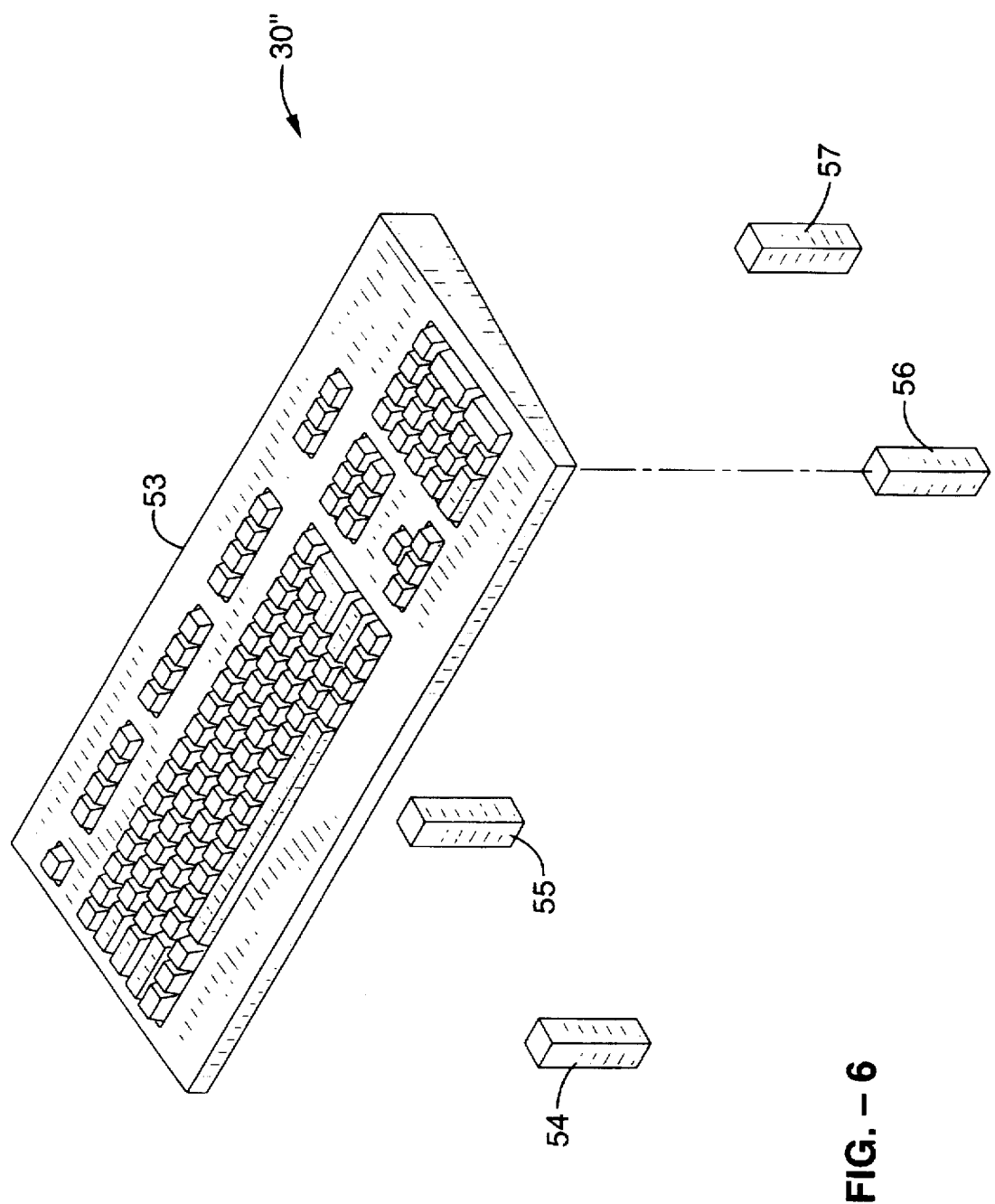
FIG. 6 is an exploded view of an external keyboard apparatus according to another alternative embodiment of this invention.

FIG. 6 shows an alternative embodiment in which an external keyboard apparatus 30" includes an external keyboard 53 with legs 54, 55, 56, 57 or other propping structures.

The legs 54–57 elevate the keyboard 53 relative to the portable computer 10 allowing the keyboard 53 to rest over the embedded keyboard 14 of computer 10. In alternative embodiments the legs 54–57 or other propping devices are fixed in position or adjustable among different positions. In addition, alternative embodiments of the legs 54–57 or other propping devices define a fixed height or an adjustable height. Among the various fixed-leg embodiments are legs formed by pedestals as shown in FIG. 5. In an alternative embodiment two pedestals 36, 38 as shown in FIG. 3 are present. Exemplary embodiments include propping devices which telescope, fold or otherwise retract.

In still other embodiments, the legs 54–57 or other propping devices are separate from the keyboard 53. In an exemplary embodiment, the legs 54–57 or other propping devices are integral to the portable computer 10 or rest upon the portable computer 10.

External Keyboard Apparatus—Keyboard / Stand Embodiments

Figure 7:
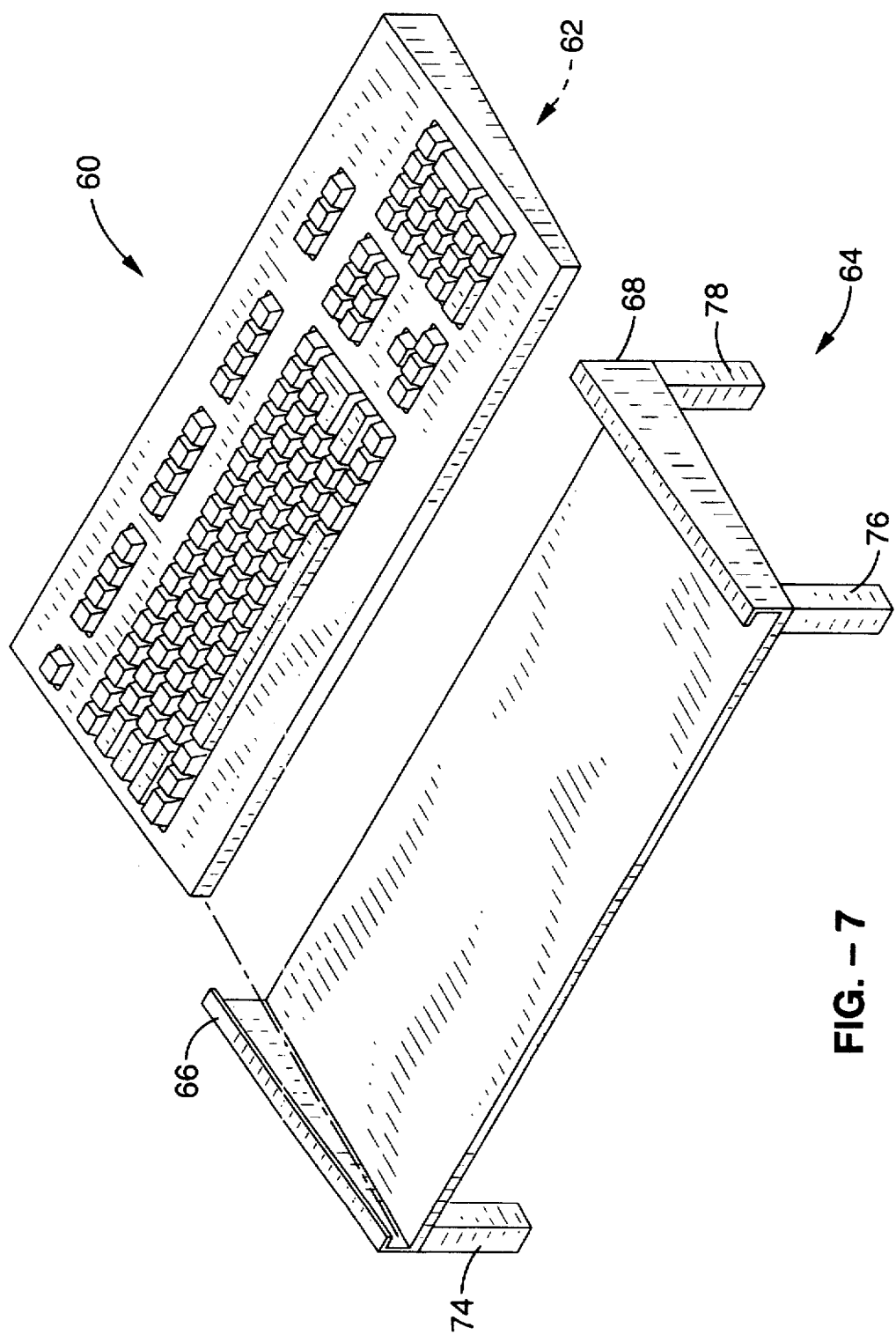
FIG. 7 is a perspective view of an external keyboard apparatus according to another embodiment of this invention.

FIG. 7 shows an alternate embodiment of an external keyboard apparatus 60 formed by a keyboard 62 and a keyboard stand 64. The keyboard 62 has a length and width approximating that of a conventional full-size keyboard 16, (e.g., 21 inches by 8 inches). Other dimensions are used in alternative embodiments. The keyboard 62 also has a conventional or non-conventional keyboard layout. The preferred embodiment includes a conventional QWERTY layout. Common adaptations include the AT keyboard layout, XT keyboard layout, and Apple MACINTOSH™ keyboard layout. Another variation is described in U.S. Pat. No. 5,336,001. In one embodiment, the keyboard 62 is a conventional full-size keyboard 16.

During operation, the keyboard 62 resides on the stand 64. In preferred embodiments the keyboard 64 is stabilized relative to the stand 64 by edge rails 66, 68 or another securing mechanism. The keyboard 64 slides onto the stand 64 and secured against sideways movement by the rails 66, 68. In an alternative embodiment, a stand 64' (see FIG. 8) includes two posts 70, 72 which are received into the underside of the keyboard 62 locking the keyboard in position relative to the stand 64'. Various alternate securing mechanisms are used in other embodiments, including at the least, snaps, velcro, hinges, latches, pins, or grooves.

Figure 8:
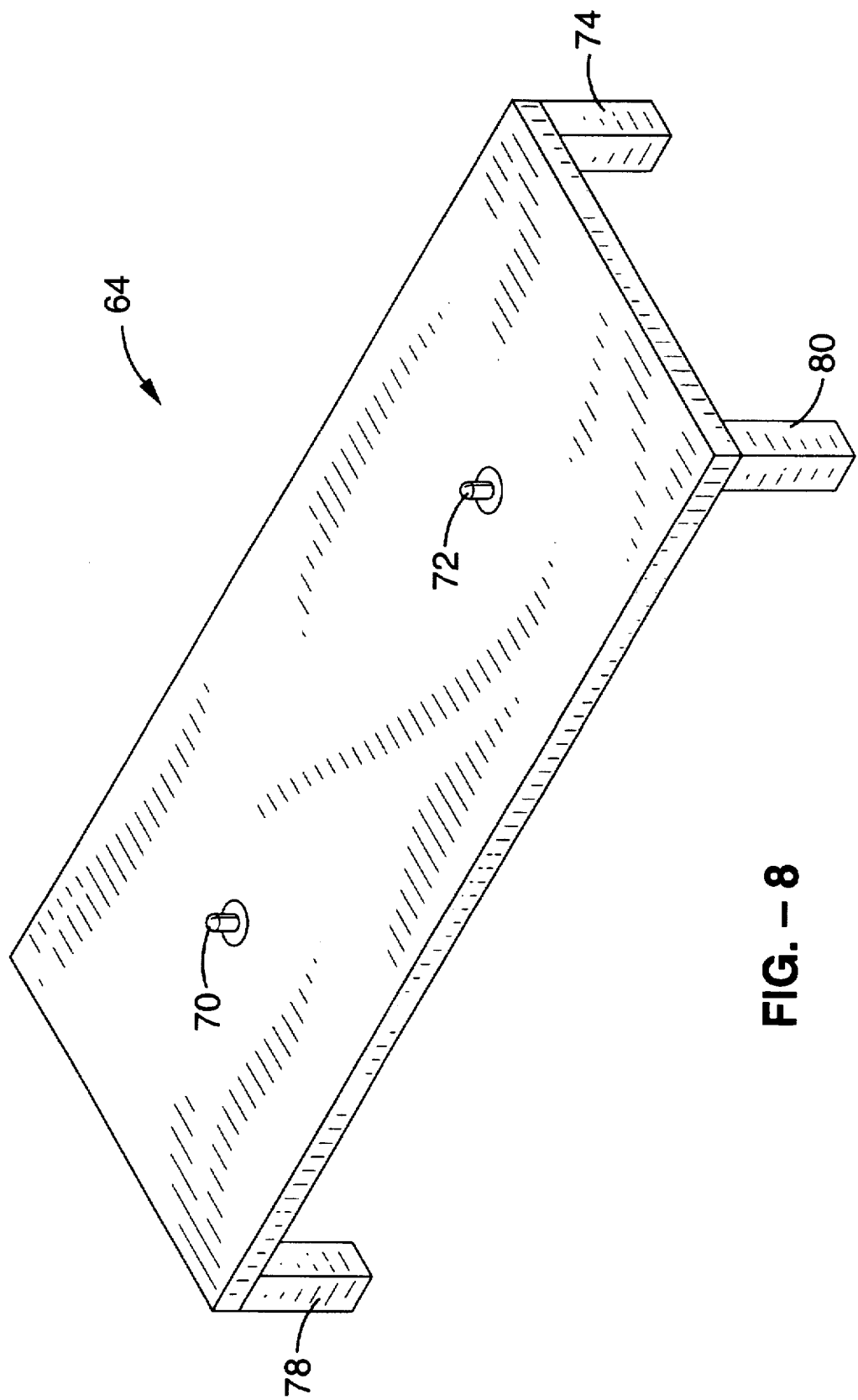
FIG. 8 is a perspective view of a keyboard stand portion of an external keyboard apparatus according to an embodiment of this invention.

The keyboard stand 64 elevates the keyboard 62 relative to the portable computer 10 allowing the keyboard 64 to rest over at least a portion of the keyboard compartment 18 of the computer 10. FIGS. 7 and 8 show embodiments with legs 74, 76, 78, 80. In alternative embodiments the legs 74–80 or other propping devices are fixed in position or adjustable among different positions. In addition, alternative embodiments of the legs 74–80 or other propping devices define a fixed height or an adjustable height. Among the various fixed-leg embodiments are legs formed by pedestals, (e.g., like those shown in the FIG. 5 keyboard embodiment). In an alternative embodiment two pedestals like those shown as shown in the FIG. 3 embodiment are present. Exemplary embodiments include legs or other propping devices which telescope, fold or otherwise retract.

External Keyboard Apparatus Communication With Port. Computer

The external keyboard apparatus 30, 30', 30", 60 communicates with the portable computer 10 to transmit keyboard inputs to the computer 10. In one embodiment, a standard coiled wire and serial connector is formed at the apparatus, 30, 30', 30", 60 to connect to a conventional external keyboard connector at the computer 10. In another embodiment an infrared, optical or other wireless connection is established for communication between the apparatus and the computer 10.

Figure 9:
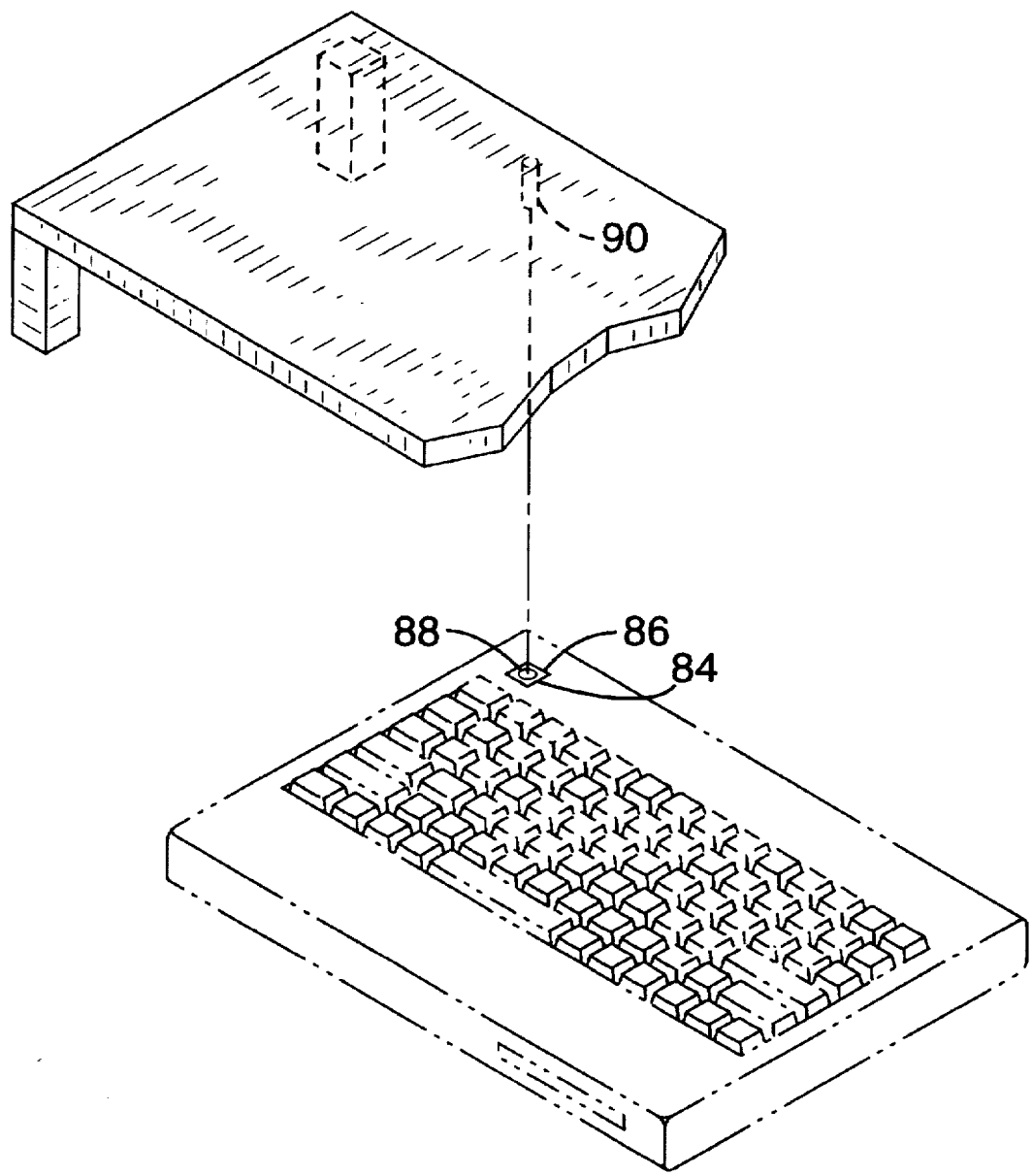
FIG. 9 is a perspective view of a portable computer keyboard compartment and a portion of an external keyboard apparatus showing respective female and male connectors according to an embodiment of this invention.

In still another embodiment, as shown in FIG. 9, the portable computer 10 has a compartment 84 with a door 86 which opens exposing an external keyboard connector 88 at the top surface of the keyboard compartment 18. Correspondingly, the apparatus, 30, 30', 30", 60 includes a mating connector 90 at its undersurface. During installation the door 86 is opened and the apparatus 30, 30', 60 is positioned over the computer 10 mating the connectors 88, 90. The mating connectors 88, 90 enable automatic connection of the apparatus to the computer 10 when the apparatus is placed at a defined position. The mating connectors 88, 90 also serve to secure and stabilize the apparatus position relative to the computer 10. In alternative embodiments the connector 90 is either rigid or flexible. A flexible connector is preferred so as to avoid interrupting or damaging the connection when the apparatus 30, 30', 60 is jarred. In alternative embodiments the portable computer 10 includes a connector 90 without either one or both of a compartment 84 and door 86.

Miscellaneous Alternative Embodiments

In alternative embodiments, the edge rails 66, 68 (see FIG. 7), posts 70, 72 (see FIG. 8), snaps, velcro, hinges, latches, pins, or other grooves are part of the portable computer 10. In such alternative embodiments, the stand 62 is omitted and the computer 10 supports the keyboard 64. The rails, snaps, velcro, hinges, latches, or grooves stabilize the position, secure and align the keyboard 64 relative to the portable computer. For post or pin embodiments, the keyboard includes openings for receiving at least a portion of the posts or pins. The posts/pins and openings stabilize and align the keyboard relative to the portable computer. In one embodiment the posts or pins are fixedly received so as to also secure the keyboard to the portable computer.

Although preferred embodiments of the invention have been illustrated and described, various alternatives, modifications and equivalents may be used. Therefore, the foregoing description should not be taken as limiting the scope of the inventions which are defined by the appended claims.

What is claimed is:

1. An external keyboard apparatus for a portable computer of the type having an embedded keyboard and a display pivotable between open and closed positions, comprising:
   (a) a housing having a top and bottom surface;
   (b) a plurality of symbol-bearing keys positioned proximate to said top surface of said housing;
   (c) communication means for electronically communicating activation of said keys to said portable computer; and
   (d) support means for supporting said bottom surface of said housing over said embedded keyboard of said portable computer when said display is in said open position wherein said apparatus is separate from said embedded keyboard.

2. An apparatus as recited in claim 1, wherein said support means is capable of being supported by a support structure which is external to said portable computer.

3. An apparatus as recited in claim 1, wherein said support means comprises a plurality of removable legs coupled to said housing.

4. An apparatus as recited in claim 1, wherein said support means comprises a plurality of adjustable legs coupled to said housing.

5. An apparatus as recited in claim 1, wherein said support means provides for adjustment of said spaced-apart relationship between said bottom surface of said housing and said embedded keyboard compartment.

6. An apparatus as recited in claim 1, further comprising means for stabilizing said housing relative to said embedded keyboard compartment.

7. A computer keyboard apparatus for placement over an embedded keyboard of a portable computer of the type having an embedded keyboard and a display pivotable between open and closed positions, comprising:

(a) a housing having a top surface and a bottom surface;

(b) a plurality of symbol-bearing keys positioned proximate to said top surface of said housing;

(c) support means for supporting said bottom surface of said housing over said embedded keyboard of said portable computer when said display is in said open position wherein said apparatus is separate from said embedded keyboard; and (d) communication means for electronically communicating key activation to said portable computer.

8. An apparatus as recited in claim 7, wherein said support means maintains said bottom surface of said housing and said embedded compartment in a spaced-apart relationship.

9. An apparatus as recited in claim 8, wherein said support means provides for adjustment of said spaced-apart relationship between said bottom surface of said housing and said embedded keyboard compartment.

10. An apparatus as recited in claim 7, wherein said support means comprises a plurality of removable legs coupled to said housing.

11. An apparatus as recited in claim 7, wherein said support means comprises a plurality of adjustable legs coupled to said housing.

12. An apparatus as recited in claim 7, further comprising means for stabilizing said housing relative to said embedded keyboard compartment.

13. A computer keyboard apparatus for placement over an embedded keyboard of a portable computer of the type having an embedded keyboard and a display pivotable between open and closed positions, comprising:

(a) a housing, said housing including a top surface at which a plurality of symbol-bearing keys are positioned and a bottom surface;

(b) support means for supporting said bottom surface of said housing over said embedded keyboard of said portable computer when said display is in said open position wherein said apparatus is separate from said embedded keyboard; and (c) communication means for electronically communicating key activation to said portable computer.

14. An apparatus as recited in claim 13, wherein said support means provides for adjustment of said spaced-apart relationship between said bottom surface of said housing and said embedded keyboard compartment.

15. An apparatus as recited in claim 13, wherein said support means comprises a plurality of removable legs coupled to said housing.

16. An apparatus as recited in claim 13, wherein said support means comprises a plurality of adjustable legs coupled to said housing.

17. An apparatus as recited in claim 13, further comprising means for stabilizing said housing apparatus relative to said embedded keyboard compartment.

18. A method of providing external keyboard input to a portable computer of the type having an embedded keyboard and a display pivotable between open and closed positions, comprising the step of positioning a separate external keyboard over said embedded keyboard of said portable computer when said display is in said open position, said external keyboard comprising:

(a) a housing, said housing including a top surface at which a plurality of symbol-bearing keys are positioned and a bottom surface;

(b) support means for supporting said bottom surface of said housing over said embedded keyboard independent of said portable computer wherein said bottom surface is capable of covering at least a portion of said embedded keyboard and is maintained in a spaced-apart relationship with said embedded keyboard; and (c) communication means for electronically communicating key activation to said portable computer.

19. A method as recited in claim 18, wherein said support means provides for adjustment of said spaced-apart relationship between said bottom surface of said housing and said embedded keyboard compartment.

20. A method as recited in claim 18, wherein said support means comprises a plurality of removable legs coupled to said housing.

21. A method as recited in claim 18, wherein said support means comprises a plurality of adjustable legs coupled to said housing.

22. A method as recited in claim 18, further comprising means for stabilizing said housing relative to said embedded keyboard compartment.

* * * * *